United States Patent Office 3,372,177
Patented Mar. 5, 1968

3,372,177
PHENYLTOLOXAMINE ALUMINUM PAMOATE
Edmund Stanley Granatek, Baldwinsville, N.Y., assignor to Bristol-Myers Company, New York, N.Y., a corporation of Delaware
No Drawing. Filed Aug. 17, 1964, Ser. No. 390,204
1 Claim. (Cl. 260—448)

This invention relates to certain novel compounds prepared from phenyltoloxamine and found to have superior properties, e.g. lack of ability to anesthetize the tongue or mouth, when used in oral medication and, more particularly, relates to phenyltoloxamine pamoate and to phenyltoloxamine aluminum pamoate.

The antihistaminic agent 2-benzylphenyl β-dimethylaminoethyl ether (also named 2-(o-benzylphenoxy)ethyl-dimethylamine) and its salts have been used as antihistaminic and antiallergic agents in medicine; the base has received the generic name phenyltoloxamine. The preparation of the base and simple salts thereof is described, for example, in U.S. Patents 2,703,324, 2,768,207 and 2,578,537.

Up to the present time it has not been possible to formulate phenyltoloxamine or salts thereof satisfactorily into chewable tablets or troches or suspensions or solutions because of the undesirable local anesthesia produced in the mouth and on the tongue by such compounds. In addition, phenyltoloxamine and its known salts have a very undesirable taste.

It was the object of this invention to provide a form of phenyltoloxamine which, when incorporated in chewable tablets, troches, suspensions and the like, would not have an offensive taste and would not anesthetize the mucous membranes of the mouth and tongue.

The object of the present invention has been achieved by the provision, according to the present invention, of phenyltoloxamine pamoate of the formula

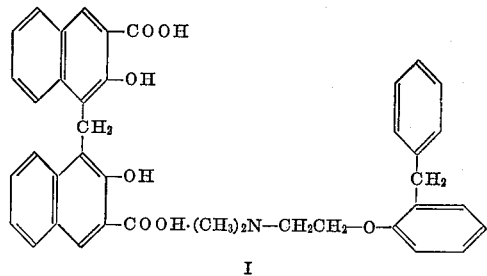

and of phenyltoloxamine aluminum pamoate of the formula

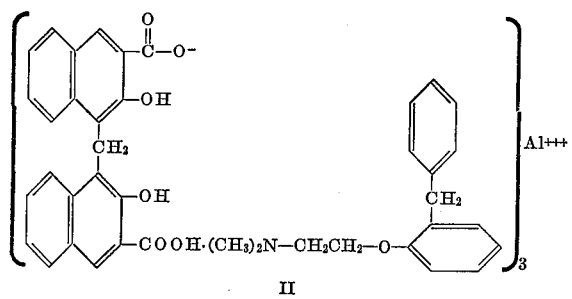

The latter compound is the preferred embodiment of the present invention.

Pamoic acid is also named 2,2'-dihydroxy-1,1'-dinaphthylmethane-3,3'-dicarboxylic acid and has also been called embonic acid.

The following examples are given to illustrate the present invention without limiting it thereto.

*Example 1*

To two liters of water there was added 20 g. phenyltoloxamine dihydrogen citrate and 19.02 g. mono-potassium pamoate. The mixture was heated with stirring to 60° C. and then allowed to cool with stirring to room temperature. The yellow, solid phenyltoloxamine pamoate (of Formula I above) precipitated and was collected by filtration, dried in vacuo overnight and found to weigh 27 g. It had a far less offensive taste than the phenyltoloxamine dihydrogen citrate.

*Example 2*

Commercial aluminum isopropoxide (9.75 g., Ortho Chemical Co., Long Island City, N.Y.) was dissolved in 650 cc. dry isopropyl ether and filtered. To this solution there was added with stirring a solution of 50 g. phenyltoloxamine pamoate (of Formula I above) in 500 cc. dry dimethylacetamide. After mixing for 15 minutes the phenyltoloxamine aluminum pamoate (of Formula II above) which precipitated was collected, washed with dry isopropyl ether, dried in vacuo at room temperature for 48 hours and found to weigh 52 g. and to have no offensive taste.

Suspensions and chewable tablets, e.g., containing 30–50 percent mannitol, and troches containing either of the products of Examples 1 and 2 are found in man to exhibit no anesthetic effect in the mouth or on the tongue.

I claim:
1. Phenyltoloxamine aluminum pamoate.

References Cited

UNITED STATES PATENTS

| | | | |
|---|---|---|---|
| 2,768,207 | 10/1956 | Cheney et al. | 260—501 |
| 3,173,835 | 3/1965 | Weiner et al. | 260—501 |
| 3,223,720 | 12/1965 | Casadio | 260—448 |
| 3,225,091 | 12/1965 | Ainsworth et al. | 260—501 |
| 3,261,868 | 7/1966 | Moffett | 260—501 |
| 2,578,537 | 12/1951 | Granatek. | |
| 2,641,610 | 6/1953 | Barber. | |
| 2,703,324 | 3/1955 | Binkley et al. | |
| 2,731,470 | 1/1956 | Elslager et al. | |

OTHER REFERENCES

The Merck Index, Seventh Edition, Merck and Co., Inc., Rahway, N.J., 1960, pp. 400, 769 and 806.

TOBIAS E. LEVOW, *Primary Examiner.*

H. M. S. SNEED, *Assistant Examiner.*